(12) United States Patent
Dulaney et al.

(10) Patent No.: US 12,065,710 B2
(45) Date of Patent: Aug. 20, 2024

(54) LASER SHOCK PEENING APPARATUS (71) Applicant: Airbus SAS, Blagnac (FR)

(72) Inventors: Jeff L Dulaney, Dublin, OH (US); Gary Grossenbacher, Dublin, OH (US); Timothy T. Gorman, Columbus, OH (US); Jeffrey A. Jewell, Delaware, OH (US); Devin R. Hilty, Westerville, OH (US)

(73) Assignee: Airbus SAS, Blagnac (FR)

( * ) Notice: Subject to any disclaimer, the term of this patent is extended or adjusted under 35 U.S.C. 154(b) by 595 days.

(21) Appl. No.: 16/834,899

(22) Filed: Mar. 30, 2020

(65) Prior Publication Data
US 2021/0301369 A1 Sep. 30, 2021

(51) Int. Cl.
C21D 10/00 (2006.01)
B23K 26/08 (2014.01)
B23K 26/356 (2014.01)

(52) U.S. Cl.
CPC ........ *C21D 10/005* (2013.01); *B23K 26/0884* (2013.01); *B23K 26/356* (2015.10)

(58) Field of Classification Search
CPC . C21D 10/005; B23K 26/356; B23K 26/0884
See application file for complete search history.

(56) References Cited

U.S. PATENT DOCUMENTS

| | | | |
|---|---|---|---|
| 4,691,896 A * | 9/1987 | Reeve | G02B 6/4438 254/134.4 |
| 6,469,275 B2 | 10/2002 | Dulaney et al. | |
| 6,528,763 B1 | 3/2003 | Lahram et al. | |
| 6,881,925 B1 | 4/2005 | Sato et al. | |
| 8,628,227 B2 * | 1/2014 | Olschowsky | G02B 27/0994 362/553 |
| 8,662,160 B2 * | 3/2014 | DeWitt | E21B 41/00 372/4 |
| 9,144,861 B2 | 9/2015 | Sokol et al. | |
| 10,226,838 B2 * | 3/2019 | Nomura | G02B 6/3624 |

(Continued)

FOREIGN PATENT DOCUMENTS

DE 19533349 A1 5/1996
JP S5997785 A 6/1984
(Continued)

OTHER PUBLICATIONS

Machine translation of KR-100800565: Lee, Apparatus for High Speed Laser Machining With Fiber Laser, 2008 (Year: 2008).*

*Primary Examiner* — Janie M Loeppke
*Assistant Examiner* — Abigail H Rhue
(74) *Attorney, Agent, or Firm* — Greer, Burns & Crain, Ltd.

(57) ABSTRACT

A system and device for laser shock peening device and components thereof. The system includes umbilical cords with flexible outer sheaths surrounding the fiber optic cable within the umbilical. The umbilical may include two different sections with different outer sheathes. The applicator device may have a laser peeing pen that has a longitudinal axis that is spaced from the longitudinal axis of the applicator device. In a method of operating the device, a first step includes a vertical movement, followed by a second step of rotation movement, and then another step of vertical movement opposite the first step.

9 Claims, 6 Drawing Sheets

(56) References Cited

U.S. PATENT DOCUMENTS

| | | |
|---|---|---|
| 11,273,520 B2 * | 3/2022 | Diwinsky .......... B23K 26/0652 |
| 2012/0074110 A1 | 3/2012 | Zediker et al. |
| 2013/0319984 A1 | 12/2013 | Linyaev et al. |
| 2018/0066336 A1 | 3/2018 | Sakai et al. |
| 2018/0085860 A1 * | 3/2018 | Krajca ................. B23K 26/706 |

FOREIGN PATENT DOCUMENTS

| | | | |
|---|---|---|---|
| KR | 100800565 B1 * | 2/2008 | |
| WO | 2019209786 A1 | 10/2019 | |

* cited by examiner

LASER SHOCK PEENING APPARATUS

TECHNICAL FIELD

The present invention relates to a laser beam delivery device, and more particularly to such a device used for a laser shock peening application on a workpiece.

BACKGROUND

In some laser shock peening operations, a laser peens a surface by exciting water molecules which provide a shockwave to the surface. Recently, such an operation has been applied to hidden surfaces, such as bores or cavities, of a workpiece. This has resulted in the newer devices for laser peening, such as those disclosed in WO 2019/209786.

The size of various bores may make it difficult for a laser shock peening application to be effectively accomplished. Specifically, it is desirable to provide the laser relatively close to the surface for the treatment. While devices in which a laser pen rotates on its axis may work in small bores, some bores may be large, placing the laser source too far from the surface to be treated.

Additionally, since the systems for laser shock peening operations require the use of fiber optics for transporting a laser beam from a source to an applicator device, it is desirable to protect the fiber optics.

Accordingly, there is an ongoing need for providing a laser shock peening device, and components thereof, that may be used efficiently and effectively for a laser shock peening application, and in particular for such a device for a laser shock peening application in a relatively large bore or cavity of a workpiece. It is also desirable to provide devices and components for a laser peening device that adequately protect the fiber optics.

SUMMARY

A new laser peening device, and components thereof, have been invented which provides a system that is more easily configured to treat the surfaces of larger sized bores or cavities. Additionally, the new devices and components provides systems that suitably protect the conduits, control lines, fiber optics, within the umbilical.

Accordingly, in at least one aspect, the present invention may be generally characterized as providing a system for performing a laser shock peening application with a laser on a surface of a workpiece. The system may include an enclosure configured to generate a laser, an application device configured to apply the laser to a surface of a workpiece to perform the laser peening application; and, an umbilical cord having a fiber optic cable arranged to provide the laser from the enclosure to the application device. The umbilical cord has a flexible outer sheath surrounding the fiber optical cable, and the flexible outer sheath is configured to prevent the fiber optic cable from bending to a radius in which the laser degrades as a result of bending of the fiber optic cable. The outer sheath may be a flexible metal conduit.

It is contemplated that the system further includes a verification stand located between the enclosure and the application device such that the fiber optic cable extends from the enclosure to the verification stand, and from the verification stand to the application device. The outer sheath may extend between the verification stand and the enclosure comprises a flexible metal conduit. The system may include a second outer sheath extending between the verification stand and the application device. The second outer sheath may be different than the first outer sheath. The second outer sheath may be a mesh.

In at least one aspect, the present invention may also be broadly characterized as providing an applicator device for applying a laser shock peening application with a laser on a surface of a workpiece. The application device includes a frame configured to mounted to a workpiece, a longitudinal axis extending from a first end of the frame to a second end of the frame, and, a moveable pen disposed at one of the ends of the frame. The pen is configured to apply a laser onto a surface of the workpiece for the laser shock peening application. The moveable pen has a longitudinal axis spaced from the longitudinal axis of the frame.

It is contemplated that the movable pen is configured to be displaced rotationally about the longitudinal axis of the applicator device and along a direction parallel to the longitudinal axis of the applicator device. Additionally, the movable pen may be configured to be rotated at least 180 degrees but less than 360 degrees about the longitudinal axis of the applicator device.

It is also contemplated that a distance between the longitudinal axis of the movable pen and the longitudinal axis of the applicator device is adjustable.

It is further contemplated that an angular relationship between a direction of the laser application and a line extending between the longitudinal axis of the movable pen and the longitudinal axis of the applicator device is the same as the pen rotates around the longitudinal axis of the applicator device.

In at least one further aspect, the present invention generally may be characterized as providing a process for a laser peening application an inner surface of a bore in a workpiece with an applicator device having a longitudinal axis and a pen applying the laser with a longitudinal axis offset from the longitudinal axis of the applicator device by: a. moving the pen in a first direction parallel to the longitudinal axis of the applicator device while applying a laser to the inner surface; b. rotating the pen around the longitudinal axis of the applicator device after step a; and, c. moving the pen in a second direction parallel to the longitudinal axis of the applicator device while applying the laser to the inner surface after step b, the first direction opposite the second direction.

It is contemplated that the process further includes rotating the pen around the longitudinal axis of the applicator device after step c.

It is further contemplated that the process includes mounting the applicator device to the workpiece before step a. The processes may then include a step d. of repeating steps a. to c. until the pen has been rotated at least 180 degrees but less than 360 degrees about the longitudinal axis of the applicator device. The process may also further include: e. unmounting the applicator device to the workpiece after step d.; f. rotating the applicator device 180 degrees around the bore; g. mounting the applicator device to the workpiece after step f; and, h. repeating steps a. to c. until the pen has been rotated at least 180 degrees but less than 360 degrees about the longitudinal axis of the applicator device.

These aspects, embodiments, and features, which may be combined in any manner, are described in more detail below and shown in the attached drawings.

DESCRIPTION OF THE DRAWINGS

One or more exemplary embodiments of the present invention will be described below in conjunction with the following drawing figures, in which.

DETAILED DESCRIPTION

As noted above, the present invention is directed at providing a system for performing a laser shock peening application with a laser on a surface of a workpiece. In order to sufficiently protect the fiber optic cables in the umbilical cords, an outer sheath is used to prevent the umbilical from being bent to a radius that would break the fiber optic cable. Additionally, the application device may have a laser peeing pen that is off-axis to accommodate larger sized bores. Finally, the process of using the device may include specific steps of vertical movements followed by rotational movement and then vertical movement opposite the first vertical movement.

With these above general aspects of the present invention in mind, one or more embodiments of the present invention will be described with the understanding that the following description is not intended to limit the present disclosure.

Figure 1:
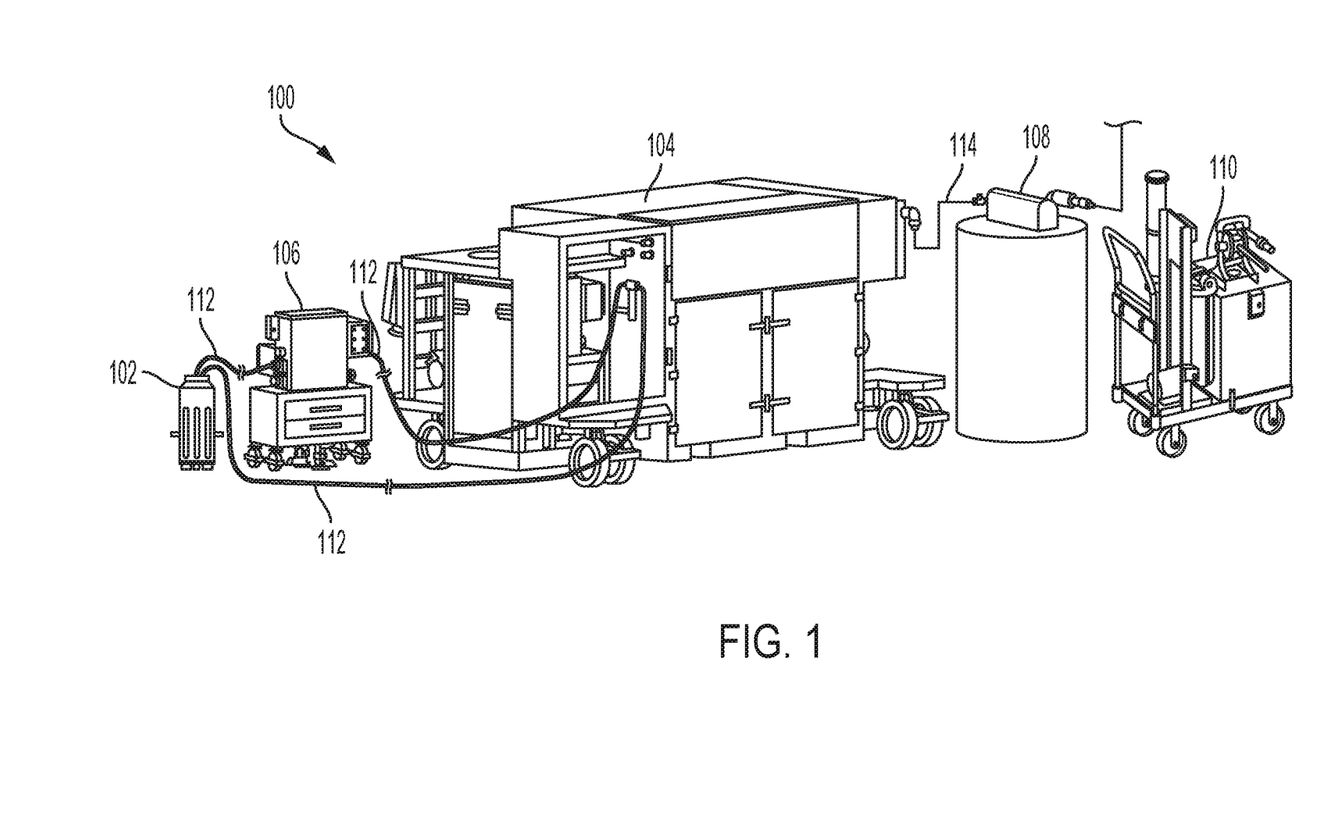
FIG. 1 is a schematic view of a system for performing laser shock peening that is used in accordance with various aspects of the present invention.

FIG. 1 depicts a system 100 for performing laser shock peening at multiple surface locations on one or more workpieces. This system 100 is particularly suitable for performing laser peening at the inner surfaces of a bore in a workpiece, and in particular for the multiple spar fastener bores in an aircraft wing. However, such a use is not intended to be limiting.

As shown in FIG. 1, the system 100 generally includes an applicator device 102, an enclosure 104, a verification stand 106, a vacuum 108, and a water system 110. The applicator device 102, discussed in more detail below, is the component of the system 100 that interacts with the surface(s) of a workpiece for performing the laser shock peening operation thereon.

The enclosure 104 houses the components that provide the applicator device 102 with a laser beam, power, overly water, and a flow of air. The enclosure 104 further includes a user interface or input device like a touch screen, keyboard, mouse, or the like and a controller for providing the applicator device 102 with control signals for operating motors that insert, advance, retract, and rotate the delivery device in a workpiece bore.

As will be appreciated, a "controller", as used throughout this application, means a processing unit that includes one or more processors configured to cause a series of steps to be performed so as to implement methods such that instructions, when executed by a computing device or other programmable apparatus, may cause the functions/acts/steps specified in the methods described herein to be executed. The processors may be, for example, any type of general-purpose processor, microprocessor, controller, microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The controller may also include memory that is any suitable known or other machine-readable storage medium. The memory may be a non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the controller such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may include any storage means (e.g., devices) suitable for retrievably storing the computer-executable instructions executable by the processor. Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various configurations, arrangements, or embodiments.

Returning to FIG. 1, the verification stand 106 is operatively interposed between the enclosure 104 and the applicator device 102. This component of the system 100 also includes a controller for evaluating the laser beam at the applicator device 102 to verify characteristics such as spot size, energy, temporal profile, etc. and confirm that the laser being applied by the applicator device 102 meets the desired characteristics to ensure consistent and even laser chock peening application on the surface of the workpiece being treated.

Umbilical cords 112 provide for communication between the enclosure 104 with the applicator device 102 and the verification stand 106, as well as convey power, overlay water, air, and control signals as needed for the enclosure 104 to operate both the applicator device 102 and the verification stand 106. As discussed, each umbilical cord 112 contains one or more conduits, cables, pipes, optical fibers, or other structures which provide power, control signals, data signals, water, the laser, vacuum, and compressed air.

Umbilical cords 112 provide for communication between the enclosure 104 with the applicator device 102 and the verification stand 106, as well as convey power, overlay water, air, and control signals as needed for the enclosure 104 to operate both the applicator device 102 and the verification stand 106. As will be appreciated, each umbilical cord 112 contains one or more conduits, cables, pipes, or other structures.

The vacuum 108 is configured to provides a source of negative pressure to the applicator 102 so that water, dispensed from the applicator 102, can be collected. An air line 114 is extended from the vacuum 108 to the enclosure 104 and the negative pressure is provided to the applicator 102 through the umbilical cord 114.

Figure 2:
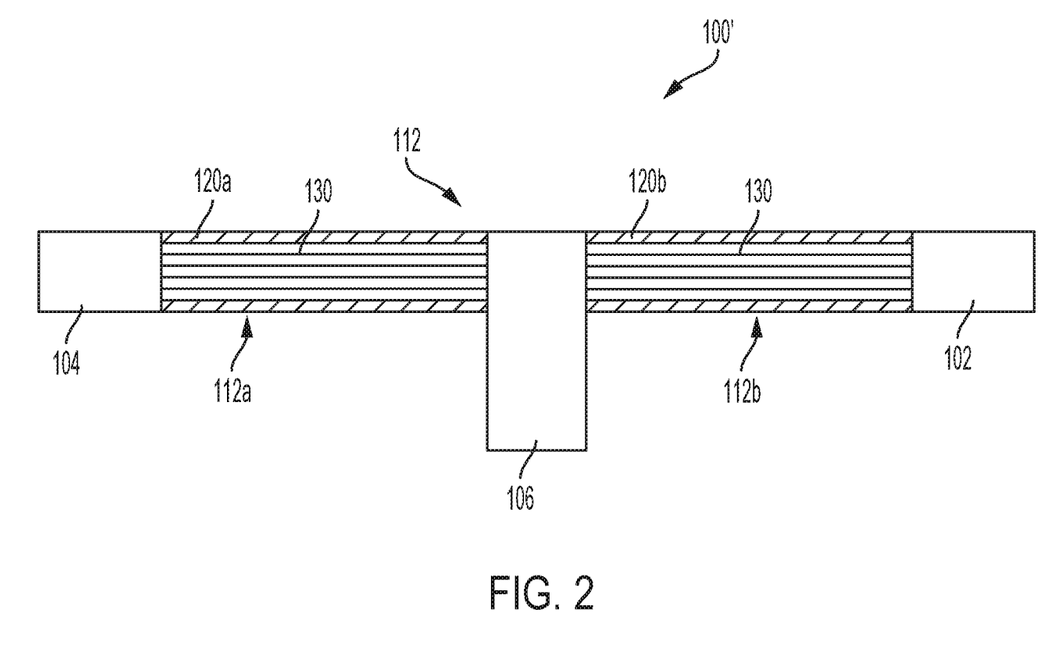
FIG. 2 is another schematic view of a system for performing laser shock peening that is used in accordance with various aspects of the present invention.

Turning to FIG. 2, another system 100' is schematically shown with some of the same components discussed above. In the depicted embodiment of FIG. 2, the umbilical cord 112 extending between the enclosure 104, the applicator device 102, and the verification stand 106 has two sections 112a, 112b. The first section 112a of the umbilical cord 112 extends between the enclosure 104 and the verification stand 106. The second section 112b of the umbilical cord 112 extends between the verification stand 106 and the applicator device 102. As should be appreciated, some of the conduits, cables, and pipes within the first umbilical section 112a may merely pass through the verification stand 106 (for example, a cable carrying control signals for the applicator device 102).

The umbilical cord sections 112a, 112b each have an outer sheath 120a, 120b surrounding the conduits, cables, lines, and pipes within the umbilical cord sections 112a, 112b. The outer sheathes 120a, 120b are configured to be flex and bend, but the outer sheathes 120a, 120b are prevented from bending to a radius that is at or greater than the radius in which the laser degrades as a result of bending of the fiber optic cable. The outer sheathes 120a, 120b may be configured so as to be prevented from bending to radius in which the fiber optic cable 130 may be damaged. Additionally, the outer sheathes 120a, 120b may be configured so as to be prevented from bending to radius in which the fiber optic cable 130 within the umbilical cord 112 to break.

Figure 3:
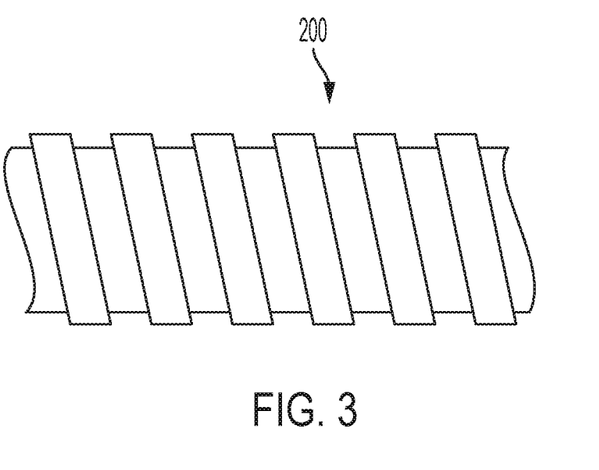
FIG. 3 is an outer sheath of an umbilical in one or more aspects of the present invention.
Figure 4:
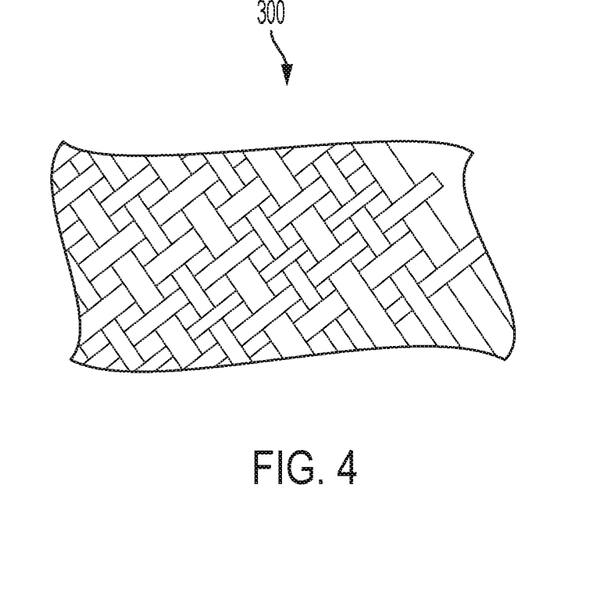
FIG. 4 is another outer sheath of an umbilical in one or more aspects of the present invention.

For example, the outer sheathes 120a, 120b may be a metallic outer sheath, for example, a flexible metal conduit 200, as depicted in FIG. 3 or as a mesh 300 as depicted in FIG. 4, which may be nylon or metal.

The use of the metal for the outer sheathes 120a, 120b is particularly suited to allow the mobility of the applicator device 102 relative to the laser source in the enclosure 104, but provide the appropriate configuration to limit the bending radii of the umbilical cord sections 112a, 112b. The use of nylon for the outer sheathes 120a, 120b is beneficial as being more flexible than the metal and less likely to scratch the surface of the objected being treated. Thus, the outer sheathes 120a, 120b allow the umbilical cord 112 to flex as the enclosure 104, the applicator device 102, and the verification stand 106 are moved relative to each other, but provide sufficient protection and structural integrity to avoid bending the fiber optic cable 130 too much. As would be appreciated, the amount of bending that is tolerable would depend, in part, on the thickness of the fiber optic cable 130.

In a preferred configuration, the first portion 112a of the umbilical 112 includes an outer sheath 120a that is a flexible metal conduit. While it is contemplated that the second portion 112b of the umbilical 112 may also include an outer sheath 120b that is metal, it is contemplated that the second portion 112b of the umbilical 112 include an outer sheath 120b that is different, preferably lighter, than the material of the first portion 112a, such as the mesh which may be lighter. By using the two materials, the second of which is lighter, the umbilical 112 provides sufficient protection to the inner conduits, cables, lines, and pipes, but is less burdensome to move.

Figure 5:
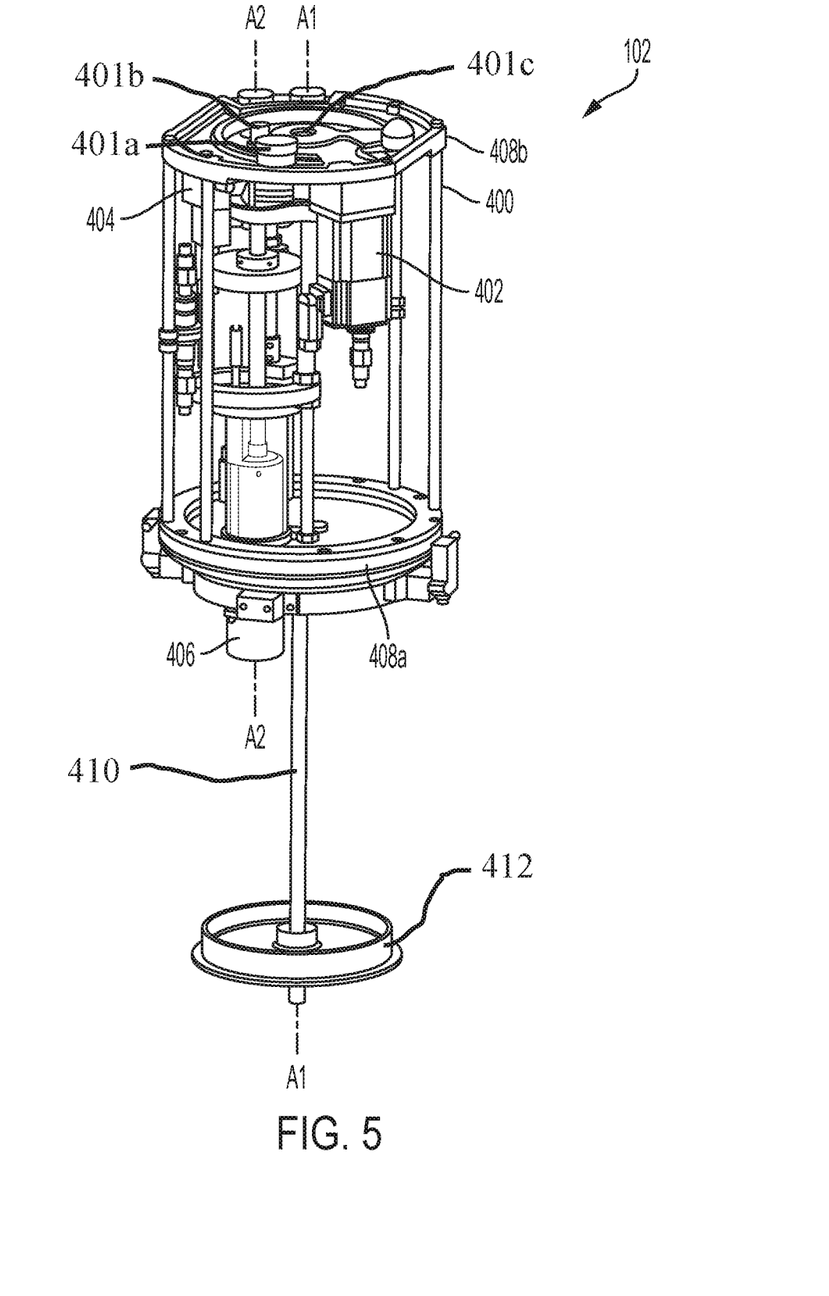
FIG. 5 is a front and top view of a device used in accordance with various aspects of the present invention.
Figure 6:
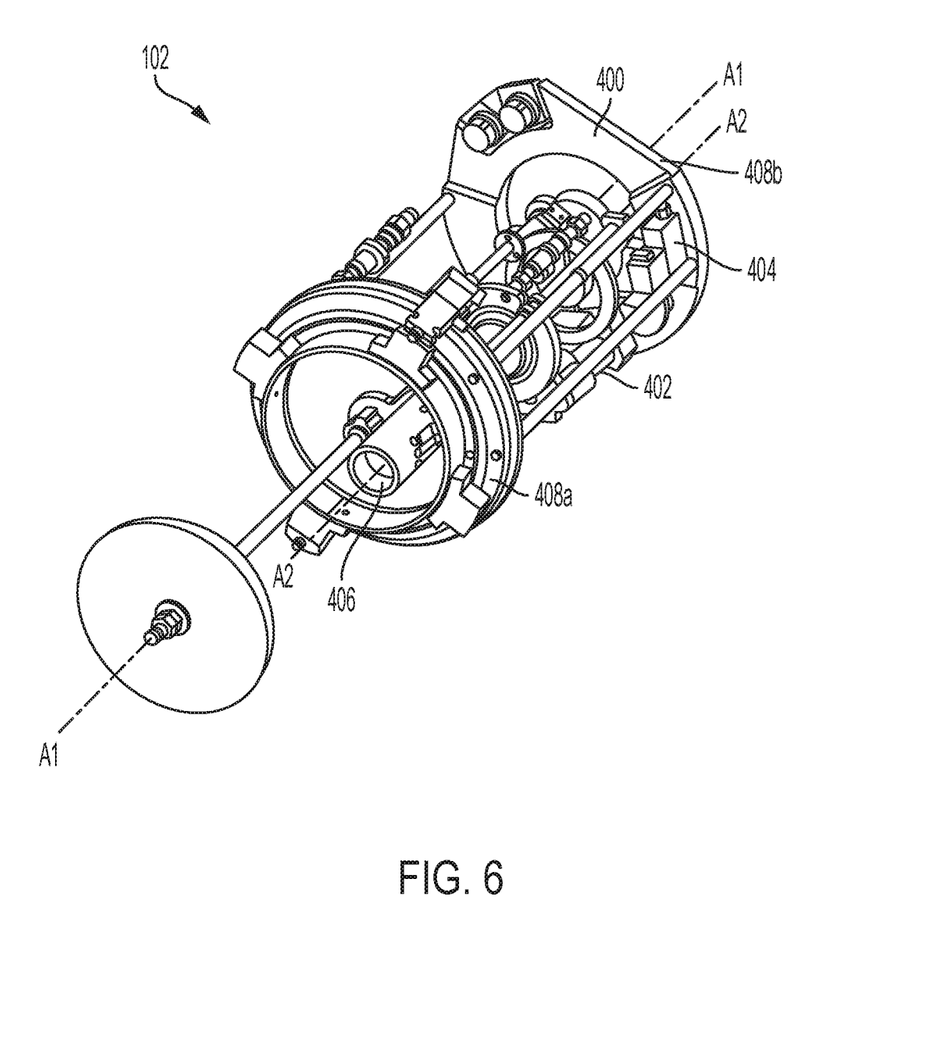
FIG. 6 is a bottom and side view of the device in FIG. 5.

Turning to FIGS. 5 and 6, the applicator device 102 has multiple components supported on a frame 400. The applicator device 102 includes various couplings for power 401a, water supply, compressed air, and water return 401b and a laser 401c, each provided via the umbilical cords 112 (see FIG. 1). The applicator device 102 includes a motorized rotational drive 402 and a motorized vertical drive 404 for moving a laser peening pen 406. The laser peening pen 406 is disposed at one end 408a of the frame 400 and applies the laser and water to the surface of the workpiece for a laser shock peening treatment.

The applicator device 102 has a longitudinal axis A1-A1. The rotational drive 206 moves the laser peening pen 406 around the longitudinal axis A1-A1, and the motorized vertical drive 208 moves the position of the laser peening pen 406 parallel with the longitudinal axis A1-A1. To ensure that the movement does not exceed a certain distance, each motor may be in communication with a limit switch which may be a button. A sensor may be included to ensure the desired rotational movement around the longitudinal axis A1-A1 is achieved.

To ensure the same angle of application of the laser, the laser peening pen 406 does not rotate about its own longitudinal axis A1-A1. In other words, when viewed from above, an angle between a direction of laser application from the laser peening pen 406 to the surface and a line connecting the two longitudinal axes will be constant regardless of the rotational position of the pen.

Thus, according to various aspects of the present invention, a longitudinal axis A2-A2 of the laser peening pen 406 is spaced from the longitudinal axis A1-A1 of the applicator device 102. This distance may be adjusted by utilizing differently sized laser peening pen 406 (each having a different distance between the axes A1-A1 and A2-A2).

By using this off-axis design, the laser peening pen 406 is moved closer to the surfaces of larger holes compared with devices in which the longitudinal axis of the laser peening pen and the applicator device are coaxial.

Due to the constraints of such an off-axis design, the laser peening pen 406 may be precluded from being rotated 360 degrees around the longitudinal axis A1-A1 of the applicator device 102 in a single treatment (i.e., without interruption). Accordingly, the laser peening pen 406 may be configured to rotate at least 180 degrees around the longitudinal axis A1-A1 of the applicator device 102, so that only two treatments are needed per bore.

In other words, the applicator device 102 may be secured to the workpiece and the first treatment of the inner surfaces of the bore started. For examples the applicator device 102 may include an elongated shaft 410 and a removable cap 412 that is secured to the elongated shaft 410. For an aperture being treated, the frame 400 is disposed on one side of the aperture and the removable cap is disposed on the opposite side of the aperture. During a treatment, the laser peening pen 406 is preferably rotated at least 180 degrees around the longitudinal axis A1-A1 of the applicator device 102. Once the first portion of the treatment is completed, the laser is stopped, the applicator device 102 is at least partially decoupled from the workpiece (by for example loosening or removing the cap 412) and the frame 400 is rotated 180 degrees about the longitudinal axis A1-A1 of the applicator device 102. Then the applicator device 102 may be re-coupled to the workpiece and the second portion treatment is performed, again, with the laser peening pen 406 being rotated at least 180 degrees before competition of the second portion of the treatment. By using at least 180 degrees in the two portions of the treatment, it is ensured that the entire inner surface of the bore is treated. Moreover, it has been found that the overlap portions (which would have surfaces treated twice) are not negatively impacted by the double treating.

Figure 7:
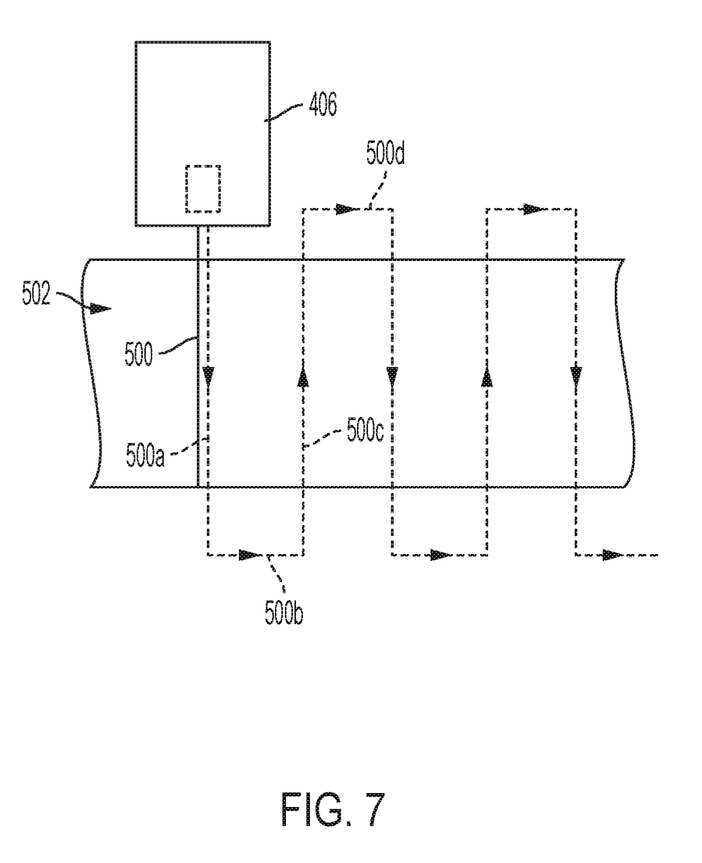
FIG. 7 is a schematic view of a movement path of a device in accordance with various aspects of the present invention.

Turning to FIG. 7 a preferred treatment path 500 along a portion of an inner surface 502 is shown. Specifically, in a first step 500a, the laser peening pen 406 is moved from a starting position vertically downward, parallel with the longitudinal axis A1-A1 of the applicator device 102 (see FIG. 5), to a stopping position.

From the stopping position, in second step 500*b* the pen is rotated (represented as horizontal portion of the path) around the longitudinal axis A1-A1 of the applicator device 102.

Then, in a third step 500*c*, the laser peening pen 406 is again moved parallel with the longitudinal axis A1-A1 of the applicator device 102 (see FIG. 5) from a starting position vertically upward to a stopping position. Thus, the direction of movement in the third step 500*c* is opposite the direction of movement of the first step 500*a*.

In a fourth step, the laser peening pen 406 is again rotated around the longitudinal axis A1-A1 of the applicator device 102 (see FIG. 5). The process continues, preferably so that the pen rotates at least 180 degrees around the longitudinal axis A1-A1 of the applicator device 102 (see FIG. 5).

It has been found that such a processing application, vertical treatment, followed by rotational movement, and then vertical treatment is better compared to other methods of treatment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A system for performing a laser shock peening application with a laser on a surface of a workpiece, the system comprising:
    an enclosure configured to generate a laser;
    an application device configured to apply the laser to a surface of a workpiece to perform the laser peening application; and,
    an umbilical cord comprising:
        a fiber optic cable arranged to provide the laser from the enclosure to the application device,
        a compressed air pipe for supplying compressed air to the application device,
        a water pipe configured to provide water to the application device,
        a conduit for supplying negative pressure to the application device for collecting water dispensed by the application device, and
        a flexible outer sheath surrounding the fiber optic cable, the compressed air pipe, the conduit for supplying negative pressure, and the water pipe, wherein the flexible outer sheath is configured to prevent the fiber optic cable from bending to a radius in which the laser degrades as a result of bending of the fiber optic cable.

2. The system of claim 1, wherein the flexible outer sheath comprises a flexible metal conduit.

3. The system of claim 1, further comprising a verification stand, the verification stand disposed between the enclosure and the application device such that the fiber optic cable extends from the enclosure to the verification stand, and from the verification stand to the application device.

4. The system of claim 3, wherein the flexible outer sheath extending between the verification stand and the enclosure comprises a flexible metal conduit.

5. The system of claim 4, further comprising a second outer sheath extending between the verification stand and the application device.

6. The system of claim 5, wherein the second outer sheath is different than the flexible outer sheath.

7. The system of claim 6, wherein the second outer sheath comprises a mesh.

8. The system of claim 1, wherein the umbilical cord further comprises a conduit for supplying data signals to the application device, and wherein the flexible outer sheath further surrounds the conduit for supplying data signals.

9. The system of claim 1, wherein the umbilical cord further comprises a conduit for supplying power to the application device, and wherein the flexible outer sheath further surrounds the conduit for power.

* * * * *